US010007722B2

(12) United States Patent
Bastide et al.

(10) Patent No.: US 10,007,722 B2
(45) Date of Patent: Jun. 26, 2018

(54) PRESENTING COLLABORATION SUMMARIES OF ARTIFACTS TO IMPROVE ENGAGEMENT OF USER IN COLLABORATION ACTIVITIES

(71) Applicant: International Business Machines Corporation, Armonk, NY (US)

(72) Inventors: Paul R. Bastide, Boxford, MA (US); Andrew E. Davis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/187,394

(22) Filed: Jun. 20, 2016

(65) Prior Publication Data

US 2017/0364588 A1    Dec. 21, 2017

(51) Int. Cl.
*G06F 17/30* (2006.01)
*H04L 12/58* (2006.01)
*G06F 17/27* (2006.01)

(52) U.S. Cl.
CPC ...... *G06F 17/30719* (2013.01); *G06F 17/279* (2013.01); *G06F 17/30616* (2013.01); *H04L 51/16* (2013.01); *H04L 51/32* (2013.01)

(58) Field of Classification Search
CPC ............. G06F 17/279; G06F 17/30616; G06F 17/30719; H04L 51/16; H04L 51/32
USPC ........................................ 715/230, 234, 254
See application file for complete search history.

(56) References Cited

U.S. PATENT DOCUMENTS

| 7,734,685 | B2 | 6/2010 | Cheng et al. |
| 8,195,718 | B2* | 6/2012 | Beckley ............ G06F 17/30991 707/721 |
| 8,225,283 | B2 | 7/2012 | Singh et al. |
| 8,868,657 | B2 | 10/2014 | Yoakum et al. |
| 9,002,855 | B2 | 4/2015 | Brooks et al. |
| 9,230,014 | B1 | 1/2016 | Peintner et al. |

(Continued)

OTHER PUBLICATIONS

"Help us Test Question Triage," Stack Overflow, http://meta.stackoverflow.com/questions/278380/help-us-test-question-triage, 2014, pp. 1-2.

(Continued)

*Primary Examiner* — Andrew R Dyer
(74) *Attorney, Agent, or Firm* — Robert A. Voigt, Jr.; Winstead, P.C.

(57) ABSTRACT

A method, system and computer program product for improving the engagement of the user in collaboration activities. A collaboration mechanism detects a request to select an artifact (community, file) by a user in a communication system. The collaboration mechanism analyzes the communication system for collaboration activities (e.g., postings) related to the selected artifact to determine a list of related artifacts. The collaboration mechanism then determines the collaboration activities for each artifact in the list of related artifacts. The collaboration mechanism then analyzes the determined collaboration activities for each artifact in the list of related artifacts to form a collaboration summary (summary of the collaboration activities) for each artifact which is presented to the user. As a result of presenting such a collaboration summary to the user, the user is more likely to engage in collaborative activities with other artifacts since they are related to the artifact selected by the user.

15 Claims, 3 Drawing Sheets

(56) References Cited

U.S. PATENT DOCUMENTS

| | | | |
|---|---|---|---|
| 2006/0053196 A1* | 3/2006 | Spataro | H04L 65/403 709/205 |
| 2006/0184566 A1* | 8/2006 | Lo | G06F 17/30038 |
| 2006/0195461 A1* | 8/2006 | Lo | G06F 17/30011 |
| 2009/0030990 A1 | 1/2009 | Muguda | |
| 2009/0187458 A1* | 7/2009 | Agrawal | G06Q 10/063118 705/7.17 |
| 2009/0217149 A1* | 8/2009 | Kamien | G06F 17/30038 715/230 |
| 2010/0113155 A1* | 5/2010 | Brownholtz | A63F 13/12 463/42 |
| 2010/0312650 A1* | 12/2010 | Pinckney | G06F 17/30867 705/14.66 |
| 2011/0179161 A1* | 7/2011 | Guy | G06Q 10/10 709/224 |
| 2011/0307478 A1* | 12/2011 | Pinckney | G06N 99/005 707/724 |
| 2012/0095976 A1* | 4/2012 | Hebenthal | G06F 17/30867 707/706 |
| 2012/0226703 A1* | 9/2012 | Yamamoto | G06F 17/30705 707/748 |
| 2013/0007634 A1 | 1/2013 | Galvin, Jr. et al. | |
| 2013/0124449 A1* | 5/2013 | Pinckney | G06F 17/30867 706/52 |
| 2013/0173703 A1 | 7/2013 | Burris et al. | |
| 2013/0275885 A1* | 10/2013 | Spataro | G06Q 10/107 715/753 |
| 2014/0278786 A1* | 9/2014 | Liu-Qiu-Yan | G06Q 30/0201 705/7.32 |
| 2014/0337328 A1* | 11/2014 | Sarvabhotla | G06F 17/30867 707/723 |
| 2015/0052153 A1 | 2/2015 | Rubinstein et al. | |
| 2015/0081802 A1 | 3/2015 | Borenstein | |
| 2015/0186932 A1* | 7/2015 | Xu | G06Q 30/0251 705/14.66 |
| 2015/0227579 A1* | 8/2015 | Cantarero | G06F 17/30616 707/708 |
| 2015/0304186 A1* | 10/2015 | O'Sullivan | G06F 17/30312 709/224 |
| 2015/0331885 A1 | 11/2015 | Bastide et al. | |
| 2016/0110687 A1* | 4/2016 | Kamat | G06Q 10/103 705/301 |

OTHER PUBLICATIONS

Maamar et al., "Collaborative Enterprise Applications Based on Business and Social Artifacts," 2015 IEEE 24th International Conference on Enabling Technologies: Infrastructure for Collaborative Enterprises, Jun. 15-17, 2015, pp. 150-155.

Anonymously, "Method and System of Automatically Creating Online Communities Based on Collaboration Artifacts," IP.com, IP.com No. IPCOM000239712D, Nov. 26, 2014, pp. 1-2.

Bispo et al., "Using a Collaboration Model to Classify Artifacts in Software Product Line for Collaborative Systems," 2014 IEEE 18th International Conference on Computer Supported Cooperative Work in Design, May 21-23, 2014, pp. 523-528.

* cited by examiner

PRESENTING COLLABORATION SUMMARIES OF ARTIFACTS TO IMPROVE ENGAGEMENT OF USER IN COLLABORATION ACTIVITIES

TECHNICAL FIELD

The present invention relates generally to collaboration applications, and more particularly to presenting collaboration summaries of artifacts (e.g., file, wiki, blog, community, social networking application) to improve engagement of user in collaboration activities.

BACKGROUND

Collaboration applications are designed to help people involved in a common task to achieve their goal. For example, these collaboration applications may allow a user to share a file with other users, such as other members in the same business division. In another example, these collaboration applications may allow a user to easily connect with other users in different virtual communities.

Typically, these collaboration applications present list views of artifacts (e.g., file, wiki, blog, community, social networking application) that are used in collaboration efforts among users. These list views typically include a summary with only a minimal amount of details, such as the last activity of the artifact. For example, the summary may include the details of a last update being made to the user's activity stream.

However, such minimal details may not cause the user to engage in utilizing the collaborative artifact or other related collaborative artifacts.

Unfortunately, there is not currently a means for improving the engagement of the user in collaboration activities, such as engaging in collaboration activities of various related collaborative artifacts.

SUMMARY

In one embodiment of the present invention, a method for improving engagement of user in collaboration activities comprises detecting a request to select an artifact in a communication system. The method further comprises analyzing the communication system for collaboration activities related to the artifact to determine a list of related artifacts. The method additionally comprises determining collaboration activities for each artifact in the list of related artifacts. Furthermore, the method comprises analyzing the determined collaboration activities for each artifact in the list of related artifacts to form a collaboration summary for each artifact in the list of related artifacts, where the collaboration summary comprises a summary of collaboration activities. Additionally, the method comprises presenting the collaboration summary for each artifact in the list of related artifacts to a user.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
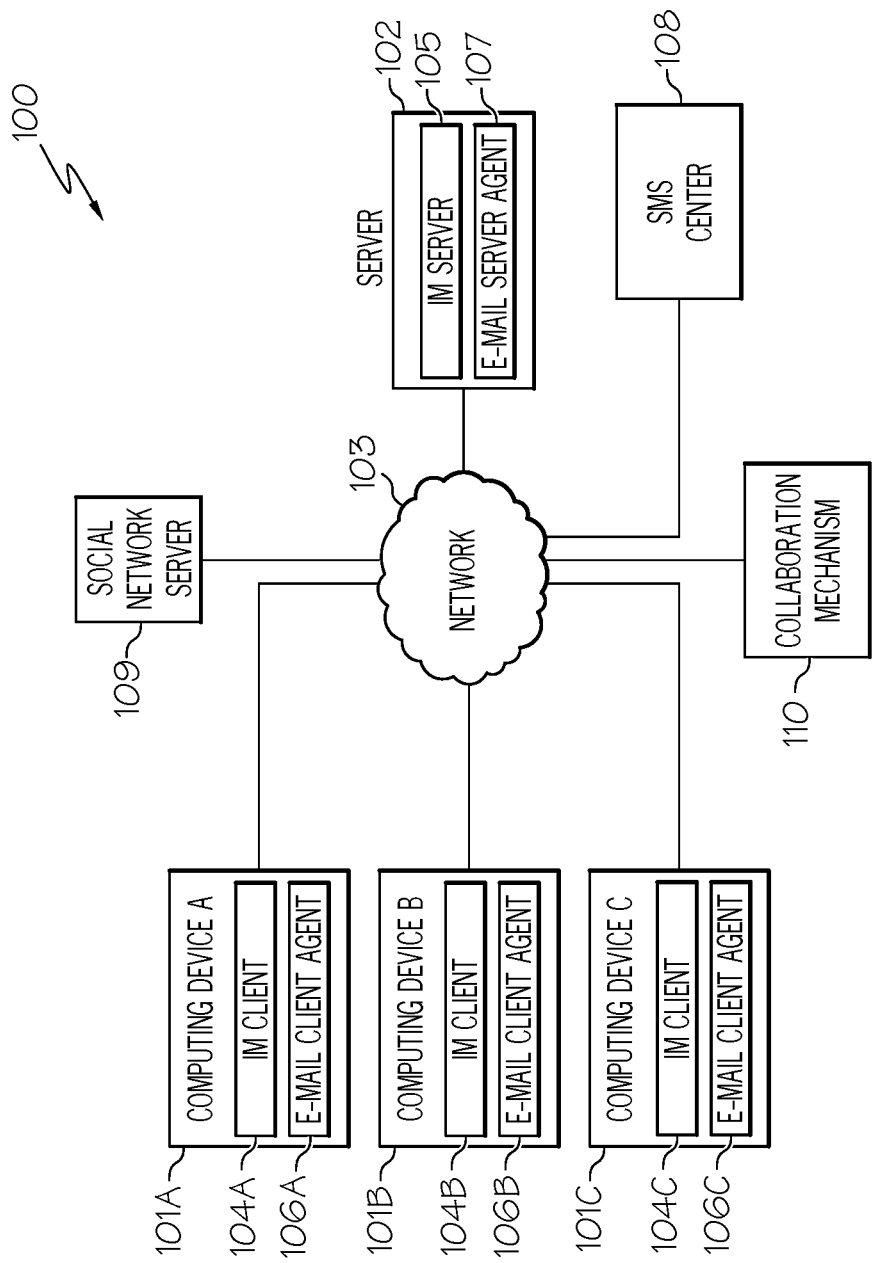
FIG. 1 illustrates a communication system configured in accordance with an embodiment of the present invention.

The present invention comprises a method, system and computer program product for improving the engagement of the user in collaboration activities. In one embodiment of the present invention, a mechanism, referred to herein as the "collaboration mechanism," detects a request to select an artifact by a user in a communication system. An "artifact," as used herein, refers to a digital object displayed to the user on the user's computing device that is used for engaging in collaborative activity with other users. The collaboration mechanism analyzes the communication system for collaboration activities related to the selected artifact to determine a list of related artifacts. "Collaboration activities" or "collaborative activities," as used herein, refer to user actions (e.g., comments, postings, sharings) that occur when using artifacts. These activities (e.g., postings) may then be analyzed, such as via natural language processing, to then identify other related artifacts. For example, if the user selected a community space directed to the baseball team of the DETROIT TIGERS and the collaboration activities involve recent postings about the team's star pitcher Justin Verlander, then related artifacts may be deemed to involve baseball, the baseball team of the DETROIT TIGERS, and the pitcher Justin Verlander. As a result, the collaboration mechanism may identify other artifacts, such as an activity stream with a posting from one of the user's friends informing the user that Justin Verlander just struck out his 2,000th batter, a forum involving the topic of the DETROIT TIGERS, a community space dedicated to Detroit sports, etc. After determining the related artifacts, a list of such artifacts is created. The collaboration mechanism then determines the collaboration activities for each artifact in the list of related artifacts. The collaboration mechanism then analyzes the determined collaboration activities for each artifact in the list of related artifacts to form a collaboration summary for each artifact, where a "collaboration summary," as used herein, refers to a summary of the collaboration activities for the artifact in question. A collaboration summary for each artifact in the list of related artifacts is then presented to the user. In this manner, by presenting to the user a collaboration summary for each artifact (e.g., community, file, virtual business card, folder, wiki page, web page, activity stream, e-mail application, instant messenger, chat session, forum) related to an artifact requested by the user to be selected (e.g., user selected a community), the user is more likely to engage in collaborative activities with other artifacts since they are related to the artifact selected by the user. As a result, the user's experience in utilizing collaborative artifacts is enhanced whereby the user is now participating in activities with other users that the user may not have previously participated.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101 and server 102.

Computing devices 101 may be configured to send and receive text-based messages in real-time during an instant messaging session. Any user of computing devices 101 may be the creator or initiator of an instant message (message in instant messaging) and any user of computing devices 101 may be a recipient of an instant message. Furthermore, any user of computing devices 101 may be able to create, receive and send e-mails. Additionally, any user of computing devices 101 may be able to send and receive text messages, such as Short Message Services (SMS) messages.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing devices 101A-101C include a software agent, referred to herein as the Instant Messaging (IM) client 104A-104C, respectively. Instant messaging clients 104A-104C may collectively or individually be referred to as instant messaging clients 104 or instant messaging client 104, respectively. Furthermore, server 102 includes a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for computing device 101 to connect to the IM server 105 which provides the functionality of distributing the instant messages to the IM clients 104 associated with each of the sharing users.

Computing device 101A-101C may further include a software agent, referred to herein as the e-mail client agent 106A-106C, respectively. E-mail client agents 106A-106C may collectively or individually be referred to as e-mail client agents 106 or e-mail client agent 106, respectively. Furthermore, server 102 may include a software agent, referred to herein as the e-mail server agent 107. E-mail client agent 106 enables the user of computing device 101 to create, send and receive e-mails. E-mail server agent 107 is configured to receive e-mail messages from computing device 101 and distribute the received e-mail messages among the one or more computing devices 101.

While the preceding discusses each computing device 101 as including an IM client 104 and an e-mail client agent 106, each computing device 101 may not necessarily include each of these software agents. Furthermore, while the preceding discusses a single server 102 including the software agents, such as IM server 105 and e-mail server agent 107, multiple servers may be used to implement these services. Furthermore, each server 102 may not necessarily be configured to include all of these software agents, but only a subset of these software agents.

System 100 further includes a Short Message Service (SMC) center 108 configured to relay, store and forward text messages, such as SMS messages, among computing devices 101 through network 103.

System 100 further includes a social network server 109, which may be a web server configured to offer a social networking and/or microblogging service, enabling users of computing devices 101 to send and read other users' posts. "Posts," as used herein, include any one or more of the following: text (e.g., comments, sub-comments and replies), audio, video images, etc. Social network server 109 is connected to network 103 by wire or wirelessly. While FIG. 1 illustrates a single social network server 109, it is noted for clarity that multiple servers may be used to implement the social networking and/or microblogging service.

System 100 further includes a unit, referred to herein as the "collaboration mechanism 110," connected to network 103 via wire or wirelessly. Collaboration mechanism 110 is configured to improve engagement of the user in collaboration activities among other users by presenting to the user a collaboration summary for each artifact (e.g., community, file, virtual business card, folder, wiki page, web page, activity stream, e-mail application, instant messenger, chat session, forum) related to an artifact requested by the user to be selected (e.g., user selected a community) as discussed further below in connection with FIG. 3. By presenting to the user a collaboration summary for each artifact that is related to the artifact shown to be of interest to the user, collaboration mechanism 110 improves the engagement of the user in collaboration activities. A description of the hardware configuration of collaboration mechanism 110 is provided below in connection with FIG. 2.

System 100 is not to be limited in scope to any one particular network architecture. System 100 may include any number of computing devices 101, servers 102, networks 103, SMS centers 108, social network servers 109 and collaboration mechanisms 110.

Figure 2:
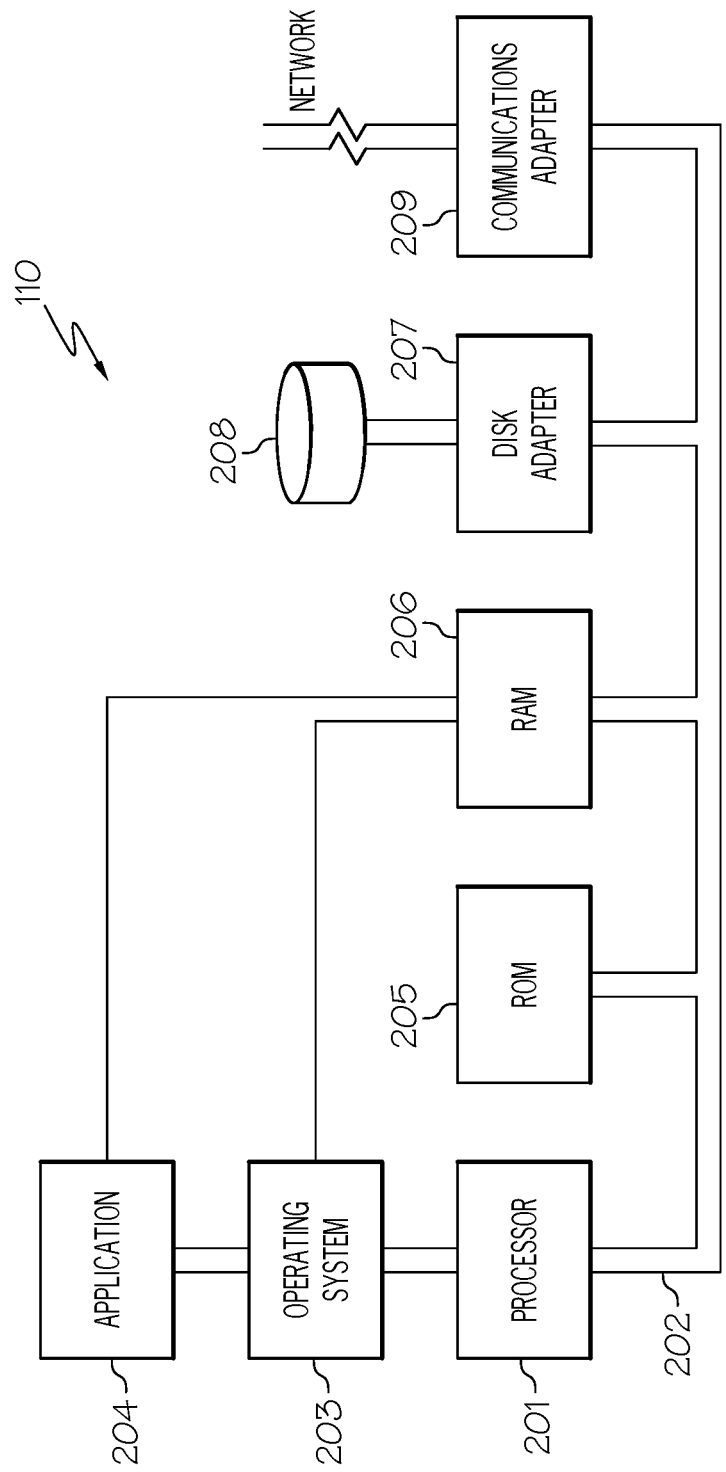
FIG. 2 illustrates a hardware configuration of a collaboration mechanism configured in accordance with an embodiment of the present invention.

Referring now to FIG. 2, FIG. 2 illustrates a hardware configuration of collaboration mechanism 110 (FIG. 1), which is representative of a hardware environment for practicing the present invention. Referring to FIG. 2, collaboration mechanism 110 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for improving engagement of the user in collaboration activities as discussed further below in connection with FIG. 3.

Referring again to FIG. 2, read-only memory ("ROM") 205 is coupled to system bus 202 and includes a basic input/output system ("BIOS") that controls certain basic functions of collaboration mechanism 110. Random access memory ("RAM") 206 and disk adapter 207 are also coupled to system bus 202. It should be noted that software components including operating system 203 and application 204 may be loaded into RAM 206, which may be collaboration mechanism's 110 main memory for execution. Disk adapter 207 may be an integrated drive electronics ("IDE") adapter that communicates with a disk unit 208, e.g., disk drive. It is noted that the program for improving engagement of the user in collaboration activities, as discussed further below in connection with FIG. 3, may reside in disk unit 208 or in application 204.

Collaboration mechanism 110 may further include a communications adapter 209 coupled to bus 202. Communications adapter 209 interconnects bus 202 with an outside network (e.g., network 103 of FIG. 1) thereby allowing collaboration mechanism 110 to communicate with devices, such as computing devices 101, servers 102, SMS centers 108 and social network servers 109.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, collaboration applications are designed to help people involved in a common task to achieve their goal. For example, these collaboration applications may allow a user to share a file with other users, such as other members in the same business division. In another example, these collaboration applications may allow a user to easily connect with other users in different virtual communities. Typically, these collaboration applications present list views of artifacts (e.g., file, wiki, blog, community, social networking application) that are used in collaboration efforts among users. These list views typically include a summary with only a minimal amount of details, such as the last activity of the artifact. For example, the summary may include the details of a last update being made to the user's activity stream. However, such minimal details may not cause the user to engage in utilizing the collaborative artifact or other related collaborative artifacts. Unfortunately, there is not currently a means for improving the engagement of the user in collaboration activities, such as engaging in collaboration activities of various related collaborative artifacts.

Figure 3:
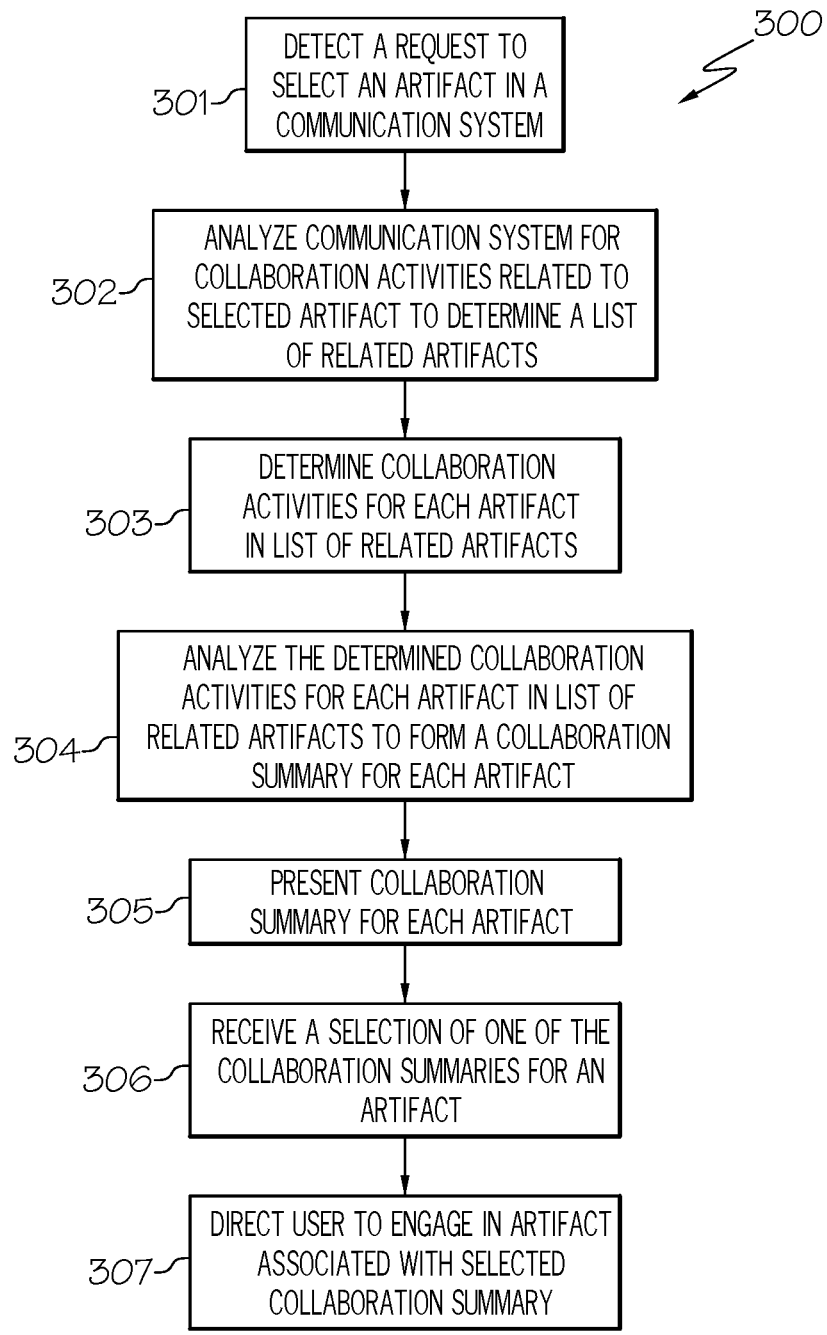
FIG. 3 is a flowchart of a method for improving the engagement of a user in collaboration activities in accordance with an embodiment of the present invention.

The principles of the present invention provide a means for improving the engagement of the user in collaboration activities, such as engaging in collaboration activities of various related collaborative artifacts, by presenting to user 101 (FIG. 1) a collaboration summary for each artifact (e.g., community, file, virtual business card, folder, wiki page, web page, activity stream, e-mail application, instant messenger, chat session, forum) related to an artifact requested by the user to be selected (e.g., user selected a community) as discussed further below in connection with FIG. 3.

FIG. 3 is a flowchart of a method 300 for improving the engagement of user 101 (FIG. 1) in collaboration activities in accordance with an embodiment of the present invention.

Referring to FIG. 3, in conjunction with FIGS. 1-2, in step 301, collaboration mechanism 110 detects a request to select an artifact in communication system 100. An "artifact," as used herein, refers to a digital object displayed to the user on the user's computing device 101 that is used for engaging in collaborative activity with other users. For example, user 101 may be presented with various objects that result in collaborative activity, such as a community, a file, a virtual business card of another user 101, a folder, a wiki page, a web page, an activity stream, an e-mail application, an instant messenger, a chat session, a forum, etc. In one embodiment, collaboration mechanism 110 detects user 101 requesting to select an artifact by detecting user 101 selecting the displayed artifact via a mouse click.

"Selecting an artifact," as used herein, also includes selecting to view a summary of the artifact. For example, user 101 may select to view a listing of communities in the user's social network, such as by selecting to view the user's community spaces.

In one embodiment, "selecting an artifact" will only be deemed to have occurred if that artifact has a threshold number of updates over a period of time or if the artifact is associated with a particular number of users (e.g., greater than five users).

In step 302, collaboration mechanism 110 analyzes communication system 100 for collaboration activities related to the selected artifact to determine a list of related artifacts. "Collaboration activities" or "collaborative activities," as used herein, refer to user actions that occur when using artifacts. For instance, examples of collaboration activities include comments (e.g., comment posted on an activity stream), likes (e.g., selecting like button), dislikes (e.g., selecting dislike button), postings, sharings (e.g., sharing a file with other members in the same department) and resharings (e.g., reposting a tweet).

In one embodiment, collaboration mechanism 110 retrieves details of the selected artifact upon detecting user 101 selecting the artifact. For example, upon user 101 selecting to view a community space (artifact), collaboration mechanism 110 retrieves details of the community space (e.g., focus of online community, such as an online community directed to health care). Furthermore, details concerning the collaboration activities of the selected artifact are retrieved, such as details concerning the names of the users who made postings in the community space as well as the time and date of such postings. These activities (e.g., postings) may then be analyzed, such as via natural language processing, to then identify other related artifacts. For example, if user 101 selected a community space directed to the baseball team of the DETROIT TIGERS and the collaboration activities involve recent postings about the team's star pitcher Justin Verlander, then related artifacts may be deemed to involve baseball, the baseball team of the DETROIT TIGERS, and the pitcher Justin Verlander. As a result, collaboration mechanism 110 may identify other artifacts, such as an activity stream with a posting from one of the user's friends informing the user that Justin Verlander just struck out his 2,000th batter, a forum involving the topic of the DETROIT TIGERS, a community space dedicated to Detroit sports, etc.

As discussed above, these artifacts may be identified using natural language processing. For example, collaboration mechanism 110 may identify keywords, such as "baseball," "DETROIT TIGERS," and "Justin Verlander" that were used in the other artifacts. These other artifacts are related to the selected artifact since the topic of the discussion contains similar or same terminology, linguistics or meaning.

Furthermore, as another example, these related artifacts may be identified based on the details of the collaborative activities, such as the names of the users who posted the messages or the time and dates of these postings. For instance, the names of the users may be used to identify other artifacts utilized by those users that may involve similar postings. Furthermore, the time and dates of these postings may be utilized to identify other artifacts utilized by those users at around those times and dates so as to identify artifacts that more likely involve similar postings.

After determining the related artifacts, a list of such artifacts is created.

In one embodiment, related artifacts which have policies associated with them that do not permit collaboration with the user are not listed in the list of related artifacts of step 302.

In step 303, collaboration mechanism 110 determines the collaboration activities for each artifact in the list of related artifacts. For example, collaboration mechanism 110 may identify the user actions (collaborative activities), such as likes, dislikes, comments, sharing of content, resharing of content, associating new content to a message (e.g., posting a link in a message), etc. Each of these activities is retrieved as well as details pertaining to these activities, such as the time and date of these activities.

In step 304, collaboration mechanism 110 analyzes the determined collaboration activities for each artifact in the list of related artifacts to form a collaboration summary for each artifact. A "collaboration summary," as used herein, refers to a summary of the collaboration activities for the artifact in question. In one embodiment, such an analysis involves weighting the collaboration activities. For example, those activities that are more recent are weighted higher. For instance, a posting that occurred today may be weighted higher than a posting that occurred two days ago. For example, a posting that occurred today may be weighted 1, whereas, a posting that occurred yesterday may be weighted 0.5 and so forth.

In step 305, collaboration mechanism 110 presents a collaboration summary for each artifact in the list of related artifacts to user 101. In one embodiment, the collaboration activities in the collaboration summary for each artifact are ordered based on the weights assigned to them. In this manner, the more important collaboration activities appear towards the top of the summary. By presenting to user 101 a collaboration summary for each artifact (e.g., community, file, virtual business card, folder, wiki page, web page, activity stream, e-mail application, instant messenger, chat session, forum) related to an artifact requested by the user to be selected (e.g., user selected a community), user 101 is more likely to engage in collaborative activities with other artifacts since they are related to the artifact selected by user 101. Collaboration mechanism 110 is now able to improve the engagement of the user in collaboration activities, such as engaging in various related collaborative artifacts. As a result, the user's experience in utilizing collaborative artifacts is enhanced whereby the user is now participating in activities with other users that the user may not have previously participated. Enabling users to engage in collaborative activities in such a manner is a non-conventional way. By using computing technology to identify collaboration activities for artifacts related to an artifact selected by the user, the functionality of mechanisms, such as collaboration mechanisms, is improved by causing the user to engage in collaborative activities.

In one embodiment, in connection with presenting the collaboration summary for the artifact, digital images of users 101 or graphical representations of users 101 associated with the collaboration activities (e.g., postings) in the collaboration summary are presented to user 101 in connection with presenting the collaboration summary for each artifact. In one embodiment, such digital images or graphical representations are presented to user 101 in a geometric shape with a particular number of quadrants, such as a circle with four quadrants.

In one embodiment, collaboration mechanism 110 selects a goal for the selected artifact. For example, collaboration mechanism 110 may set a goal to improve engagement of user 101 involving files. As a result, collaboration mechanism 110 may present collaboration summaries of various artifacts involving files and the collaboration activities involving such files.

In one embodiment, the collaboration summary for each artifact in the list of related artifacts not only includes the associated collaborative activities but also details involving such activities, such as the names of the users who recently acted upon the artifact.

In step 306, collaboration mechanism 110 receives a selection of one of the collaboration summaries for an artifact from user 101.

In step 307, collaboration mechanism 110 directs user 101 to engage in the artifact associated with the selected collaboration summary.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving engagement of user in collaboration activities, the method comprising:
    detecting a request to select an artifact in a communication system, wherein said artifact is a digital object displayed to said user on a user's computing device that is used for engaging in collaborative activity with other users, wherein said selecting said artifact comprises selecting to view a collaboration summary of said artifact, wherein said selection of said artifact is detected to have occurred in response to one of the following: said artifact having a threshold number of updates over a period of time and said artifact is associated with a threshold number of users;
    analyzing said communication system for identifying collaboration activities related to said artifact, wherein said collaboration activities comprise user actions that occur when using artifacts;
    retrieving details of said artifact upon detecting said user selecting said artifact;
    retrieving details concerning said identified collaboration activities related to said artifact, wherein said details are selected from the group consisting of: names of users who made postings and time and date of said postings;
    analyzing said details of said artifact and said details concerning said identified collaboration activities related to said artifact using natural language processing to identify other related artifacts;
    creating a list of artifacts related to said artifact based on said analysis of said details of said artifact and said details concerning said identified collaboration activities related to said artifact to identify other related activities;

determining for each artifact in said list of related artifacts if the respective artifact is permitted for collaboration based on a policy associated with said respective artifact, wherein if said respective artifact is not permitted for collaboration, removing said respective artifact from said list of related artifacts;

determining, by a processor of a collaboration mechanism, collaboration activities for each artifact in said list of related artifacts, wherein said collaboration activities for each artifact in said list of related artifacts are determined using natural language processing;

analyzing, by said processor of said collaboration mechanism, said determined collaboration activities for each artifact in said list of related artifacts;

forming, by said processor of said collaboration mechanism, said collaboration summary for each artifact in said list of related artifacts based on said analysis of said determined collaboration activities for each artifact in said list of related artifacts, wherein said collaboration summary comprises a summary of collaboration activities;

weighting said collaboration activities in said collaboration summary for each artifact in said list of related artifacts based on time of said collaboration activities;

ordering said collaboration activities in said collaboration summary for each artifact in said list of related artifacts based on said weights; and presenting said collaboration summary for each artifact in said list of related artifacts to a user based on said order.

2. The method as recited in claim 1, wherein said artifact is selected from the group consisting of: a community, a file, a virtual business card, a folder, a wiki page, a web page, an activity stream, an e-mail application, an instant messenger, a chat session, and a forum.

3. The method as recited in claim 1, wherein said collaboration activities is selected from the group consisting of: comments, likes, dislikes, postings, sharings and resharings.

4. The method as recited in claim 1 further comprising:
presenting digital images of users or graphical representations of users associated with said collaboration activities in said collaboration summary in connection with presenting said collaboration summary for each artifact in said list of related artifacts.

5. The method as recited in claim 4, wherein said digital images of users or graphical representations of users associated with said collaboration activities in said collaboration summary are presented in a geometric shape with quadrants.

6. The method as recited in claim 1 further comprising:
selecting a goal for said selected artifact; and
presenting collaboration activities in said collaboration summary for each artifact in said list of related artifacts in connection with achieving said selected goal.

7. The method as recited in claim 1 further comprising:
receiving a selection of one of said collaboration summaries for an artifact in said list of related artifacts.

8. A computer program product for improving engagement of user in collaboration activities, the computer program product comprising a computer readable storage medium having program code embodied therewith, the program code comprising the programming instructions for:
detecting a request to select an artifact in a communication system, wherein said artifact is a digital object displayed to said user on a user's computing device that is used for engaging in collaborative activity with other users, wherein said selecting said artifact comprises selecting to view a collaboration summary of said artifact, wherein said selection of said artifact is detected to have occurred in response to one of the following: said artifact having a threshold number of updates over a period of time and said artifact is associated with a threshold number of users;

analyzing said communication system for identifying collaboration activities related to said artifact using natural language processing to identify other related artifacts;

retrieving details of said artifact upon detecting said user selecting said artifact;

retrieving details concerning said identified collaboration activities related to said artifact, wherein said details are selected from the group consisting of: names of users who made postings and time and date of said postings;

analyzing said details of said artifact and said details concerning said identified collaboration activities related to said artifact;

creating a list of artifacts related to said artifact based on said analysis of said details of said artifact and said details concerning said identified collaboration activities related to said artifact to identify other related activities;

determining for each artifact in said list of related artifacts if the respective artifact is permitted for collaboration based on a policy associated with said respective artifact, wherein if said respective artifact is not permitted for collaboration, removing said respective artifact from said list of related artifacts;

determining collaboration activities for each artifact in said list of related artifacts, wherein said collaboration activities for each artifact in said list of related artifacts are determined using natural language processing;

analyzing said determined collaboration activities for each artifact in said list of related artifacts;

forming said collaboration summary for each artifact in said list of related artifacts based on said analysis of said determined collaboration activities for each artifact in said list of related artifacts, wherein said collaboration summary comprises a summary of collaboration activities;

weighting said collaboration activities in said collaboration summary for each artifact in said list of related artifacts based on time of said collaboration activities;

ordering said collaboration activities in said collaboration summary for each artifact in said list of related artifacts based on said weights; and presenting said collaboration summary for each artifact in said list of related artifacts to a user based on said order.

9. The computer program product as recited in claim 8, wherein said artifact is selected from the group consisting of: a community, a file, a virtual business card, a folder, a wiki page, a web page, an activity stream, an e-mail application, an instant messenger, a chat session, and a forum.

10. The computer program product as recited in claim 8, wherein said collaboration activities is selected from the group consisting of: comments, likes, dislikes, postings, sharings and resharings.

11. The computer program product as recited in claim 8, wherein the program code further comprises the programming instructions for:
presenting digital images of users or graphical representations of users associated with said collaboration activities in said collaboration summary in connection with presenting said collaboration summary for each artifact in said list of related artifacts.

12. The computer program product as recited in claim 11, wherein said digital images of users or graphical representations of users associated with said collaboration activities in said collaboration summary are presented in a geometric shape with quadrants.

13. The computer program product as recited in claim 8, wherein the program code further comprises the programming instructions for:
  selecting a goal for said selected artifact; and
  presenting collaboration activities in said collaboration summary for each artifact in said list of related artifacts in connection with achieving said selected goal.

14. The computer program product as recited in claim 8, wherein the program code further comprises the programming instructions for:
  receiving a selection of one of said collaboration summaries for an artifact in said list of related artifacts.

15. A system, comprising:
  a memory unit for storing a computer program for improving engagement of user in collaboration activities; and
  a processor coupled to the memory unit, wherein the processor is configured to execute the program instructions of the computer program comprising:
    detecting a request to select an artifact in a communication system, wherein said artifact is a digital object displayed to said user on a user's computing device that is used for engaging in collaborative activity with other users, wherein said selecting said artifact comprises selecting to view a collaboration summary of said artifact, wherein said selection of said artifact is detected to have occurred in response to one of the following: said artifact having a threshold number of updates over a period of time and said artifact is associated with a threshold number of users;
    analyzing said communication system for identifying collaboration activities related to said artifact, wherein said collaboration activities comprise user actions that occur when using artifacts;
    retrieving details of said artifact upon detecting said user selecting said artifact;
    retrieving details concerning said identified collaboration activities related to said artifact, wherein said details are selected from the group consisting of: names of users who made postings and time and date of said;
    analyzing said details of said artifact and said details concerning said identified collaboration activities related to said artifact using natural language processing to identify other related artifacts;
    creating a list of artifacts related to said artifact based on said analysis of said details of said artifact and said details concerning said identified collaboration activities related to said artifact to identify other related activities;
    determining for each artifact in said list of related artifacts if the respective artifact is permitted for collaboration based on a policy associated with said respective artifact, wherein if said respective artifact is not permitted for collaboration, removing said respective artifact from said list of related artifacts;
    determining collaboration activities for each artifact in said list of related artifacts, wherein said collaboration activities for each artifact in said list of related artifacts are determined using natural language processing;
    analyzing said determined collaboration activities for each artifact in said list of related artifacts;
    forming said collaboration summary for each artifact in said list of related artifacts based on said analysis of said determined collaboration activities for each artifact in said list of related artifacts, wherein said collaboration summary comprises a summary of collaboration activities;
    weighting said collaboration activities in said collaboration summary for each artifact in said list of related artifacts based on time of said collaboration activities;
    ordering said collaboration activities in said collaboration summary for each artifact in said list of related artifacts based on said weights; and
    presenting said collaboration summary for each artifact in said list of related artifacts to a user based on said order.

* * * * *